United States Patent
Soulie

(10) Patent No.: US 11,746,672 B2
(45) Date of Patent: Sep. 5, 2023

(54) METHOD AND SYSTEM FOR MONITORING A SYSTEM FOR ACTUATING A COMPONENT OF A TURBOMACHINE

(71) Applicant: SAFRAN AIRCRAFT ENGINES, Paris (FR)

(72) Inventor: Sébastien Jacques François Michel Soulie, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 64 days.

(21) Appl. No.: 17/601,342

(22) PCT Filed: Apr. 3, 2020

(86) PCT No.: PCT/EP2020/059599
§ 371 (c)(1),
(2) Date: Oct. 4, 2021

(87) PCT Pub. No.: WO2020/201522
PCT Pub. Date: Oct. 8, 2020

(65) Prior Publication Data
US 2022/0178269 A1    Jun. 9, 2022

(30) Foreign Application Priority Data
Apr. 5, 2019 (FR) ..................... 1903666

(51) Int. Cl.
*F01D 17/16* (2006.01)
*F01D 17/14* (2006.01)
(Continued)

(52) U.S. Cl.
CPC ............ *F01D 17/14* (2013.01); *F02K 1/15* (2013.01); *F02K 1/76* (2013.01); *F01D 7/00* (2013.01);
(Continued)

(58) Field of Classification Search
CPC ... F01D 7/00; F01D 7/02; F01D 17/16; F01D 17/162; F01D 17/165; F01D 21/003;
(Continued)

(56) References Cited

U.S. PATENT DOCUMENTS

2010/0107598 A1   5/2010 Marin Martinod et al.
2013/0136575 A1   5/2013 Potel et al.
(Continued)

FOREIGN PATENT DOCUMENTS

FR    2 913 067 A1   8/2008
FR    2 966 617 A1   4/2012
(Continued)

OTHER PUBLICATIONS

French Search Report and Written Opinion for French Application No. 1983666, dated Jan. 27, 2020.
(Continued)

*Primary Examiner* — J. Todd Newton
*Assistant Examiner* — Behnoush Haghighian
(74) *Attorney, Agent, or Firm* — BIRCH, STEWART, KOLASCH & BIRCH, LLP

(57) ABSTRACT

The present invention concerns a method for monitoring an actuating system of a movable component, in particular a movable component of a turbomachine such as a nozzle or a blade, the actuating system comprising a control device configured to deliver a position instruction to a first cylinder and a second cylinder, each cylinder being configured to deliver a position feedback measurement in response to the position instruction, the method being implemented in a monitoring system and comprising, —a first monitoring mode in which the deviations between the position feedback measurements of the two cylinders are detected; —a second monitoring mode in which the deviations between the position feedback measurements of the two cylinders are not
(Continued)

detected; method in which the second mode is selected when at least one of the two position feedback measurements is in a transient phase.

7 Claims, 3 Drawing Sheets

(51) Int. Cl.
    *F02K 1/15*     (2006.01)
    *F02K 1/76*     (2006.01)
    *F01D 7/02*     (2006.01)
    *F01D 7/00*     (2006.01)
    *F02C 9/22*     (2006.01)
    *F02C 9/54*     (2006.01)

(52) U.S. Cl.
    CPC .............. *F01D 7/02* (2013.01); *F01D 17/162* (2013.01); *F02C 9/22* (2013.01); *F02C 9/54* (2013.01); *F05D 2220/32* (2013.01); *F05D 2240/12* (2013.01); *F05D 2270/30* (2013.01)

(58) Field of Classification Search
    CPC ...... F01D 21/14; F01D 17/02; F05D 2270/62; F05D 2270/64; F05D 2270/65; F05D 2270/66; F05D 2270/30; F05D 2260/83; F05D 2260/80; F05D 2270/821; F02K 1/15; F02K 1/76; F02C 9/22; F02C 9/54; F02C 9/28; F15B 9/00; F15B 13/16; F15B 2211/6336
    See application file for complete search history.

(56) References Cited

U.S. PATENT DOCUMENTS

| | | |
|---|---|---|
| 2013/0338898 A1 | 12/2013 | Aurousseau |
| 2016/0041550 A1 | 2/2016 | Guillory et al. |
| 2016/0328892 A1 | 11/2016 | Coupard et al. |
| 2018/0156226 A1 | 6/2018 | Chapman et al. |

FOREIGN PATENT DOCUMENTS

| | | | |
|---|---|---|---|
| FR | 2 983 236 A1 | 5/2013 |
| FR | 3 016 191 A1 | 7/2015 |
| FR | 3 024 803 A1 | 2/2016 |

OTHER PUBLICATIONS

International Search Report and Written Opinion of the International Searching Authority for International Application No. PCT/EP2020/059599, dated Jun. 9, 2020.

METHOD AND SYSTEM FOR MONITORING A SYSTEM FOR ACTUATING A COMPONENT OF A TURBOMACHINE

FIELD OF THE INVENTION

The present invention relates to the field of actuating systems of turbomachine components by means of cylinders. The invention relates more particularly to the monitoring of actuating systems of this type.

PRIOR ART

A turbomachine conventionally comprises modules having movable components such as nozzles or blades. These components must be able to move on command and their movement is controlled by means of one or more cylinders. These movable components form the kinematics of the module under consideration and are conventionally actuated by cylinders. For reasons of safety and redundancy, it is standard to carry out two position measurements on the cylinder(s) by means of a system indicating a position feedback.

For reasons of cost, it is not possible to equip each cylinder with a position feedback system of this type. Thus, if there is a greater number than two cylinders, only two cylinders, called master cylinders, are conventionally equipped with position feedback of this type.

Such a position feedback is in fact a measured position of the cylinders in response to a position instruction applied to the cylinders. In fact, the cylinder position allows knowing the degree of movement of the kinematics of the module, for example the position of the nozzle or the degree of pivoting of a blade.

In known fashion, the two cylinders must have the same position feedback in response to the same instruction. If there is a deviation between the measured positions of the two cylinders, there exists a "position deviation between cylinders" problem which is due to wear of the actuating system, which can cause breakdowns. Multiple cases of "measurement deviations between cylinders" maintenance messages have been repeatedly noted in actuating systems having large accumulated operating times. These "measurement deviations between cylinders" are linked to considerable wear of the actuating system, which generates a position offset between the two cylinders equipped with position feedback, but which are not necessarily characteristic of a breakdown.

This surge of breakdowns (real or not) entails under-wing (repairs directly on the airplane without having to remove the actuating system) and workshop repairs. These repairs are very costly in personnel and in time (search for the breakdown, replacement of cylinders).

To avoid these maintenance operations and to extend the under-wing lifetime prior to removal, there exists a need to improve the detection of measurement deviations between cylinders, the lack of which can cause an increase of observations of measurement deviations between cylinders while the actuating systems age. This increase of deviation messages reduces the availability of engines and increases the cost linked to maintenance operations.

Therefore, there exists a need to improve the detection of "measurement deviation between cylinders" while taking into account the specificity due to the normal wear of the actuating system.

DISCLOSURE OF THE INVENTION

One object of the invention is to propose a monitoring system which does not have the disadvantages of the prior art.

For this reason it is proposed, according to a first aspect, a method for monitoring an actuating system of a movable component, particularly a movable component of a turbomachine such as a nozzle or a blade, said actuating system comprising a control device configured to deliver a position instruction to a first cylinder and a second cylinder, each cylinder being configured to deliver a position feedback measurement in response to said position instruction, the method being implemented in a monitoring system and comprising,
 a first monitoring mode in which deviations between the position feedback measurements of the two cylinders are detected;
 a second monitoring mode in which deviations between the position feedback measurements of the two cylinders are not detected;
a method in which the second mode is selected provided that at least one of the two position feedback measurements is in a transient phase.

The invention is advantageously completed by the following features, taken alone or in any one of their technically possible combinations
 the method comprises a detection (T1, T2) of the transient phase of a position feedback measurement (12, 22) consisting of comparing (E3) a gradient of a measurement voltage to a threshold.
 the measurement voltage is in a transient phase if the gradient of the measurement voltage is greater than said threshold.
 the detection of the transient phase comprises a step of confirming the transient phase consisting of detecting a transient phase of said measurement voltage for a predetermined period, called the confirmation period.
 the predetermined period is comprised between 60 and 100 ms, typically 80 ms.

According to a second aspect, the invention relates to a monitoring system of an actuating system of a movable component, particularly a movable component of a turbomachine such as a nozzle or a blade, said actuating system comprising a control device configured to deliver a position instruction to a first cylinder and a second cylinder, each cylinder being configured to deliver a position feedback measurement in response to said position instruction, said monitoring system being configured to implement a method according to the first aspect of the invention.

According to a third aspect, the invention relates to a turbomachine configured to be actuated by an actuating system monitored by means of a monitoring system according to the second aspect of the invention.

The advantages of the invention are manifold.

The detection of the deviations of position feedback measurements between each cylinder allows detecting the electrical drifts of the components of the position feedback acquisition chain. In the case of kinematics controlled by two master cylinders each equipped with position feedback, the deviations seen between the two cylinders can be electrical, but also mechanical in origin. Consequently, the transient phenomena of backlash adjustment or wear introduce a loss of robustness into deviation monitoring, deviations being wrongly detected.

DESCRIPTION OF THE FIGURES

Other features, objects and advantages of the invention will be revealed by the description that follows, which is purely illustrative and not limiting, and which must be read with reference to the appended drawings in which:

FIG. 5 is a flowchart of sub-steps of a method according to one embodiment of the invention.

In all the figures, similar components carry identical references.

DETAILED DESCRIPTION OF THE INVENTION

Figure 1:
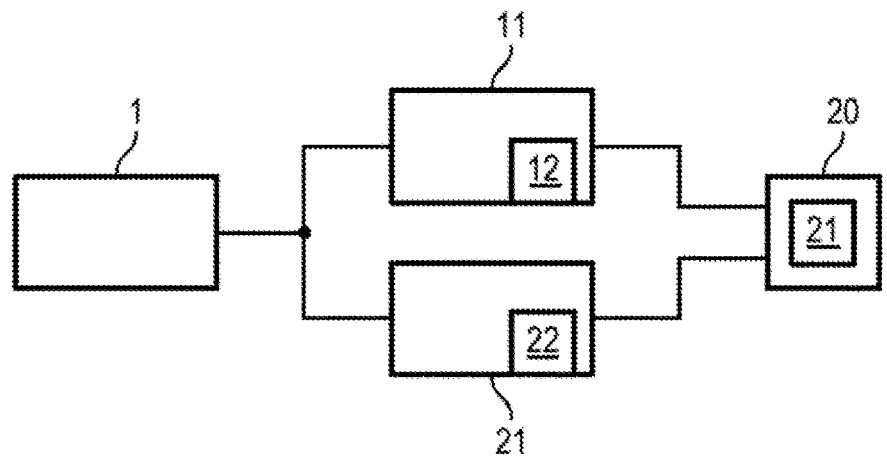
FIG. 1 illustrates an implementation environment of the invention.

FIG. 1 illustrates an actuation system 10 of a component of a turbomachine such as a nozzle or a blade which comprises a control device 1 configured to deliver a position instruction CONS to a first cylinder 11 and to a second cylinder 21. The first cylinder 11 and the second cylinder 21 are in particular the cylinders called "master" of an actuating system: each of them is provided with a position feedback module 12, 22. The other cylinders, if they exist, are not equipped with a module of this type.

The position instruction CONS is converted into an instruction voltage for controlling the cylinder 11, 21. Following the application of the position instruction CONS to each cylinder, each cylinder 11, 21 moves in compliance with said instruction CONS. In order to verify that the cylinder 11, 21 has moved by the position instruction, each cylinder 11, 21 is, as mentioned above; equipped with a position feedback module 12, 22 which measures the actual movement of the cylinder 11, 21 (hereafter position feedback measurement 12, 22). In the present case, what is meant by position feedback measurement 12, 22 is a measured voltage proportional to the actual movement of the cylinder 11, 21. A person skilled in the art will also understand that another type of signal corresponding to the position feedback of the cylinder could be contemplated.

Figure 2:
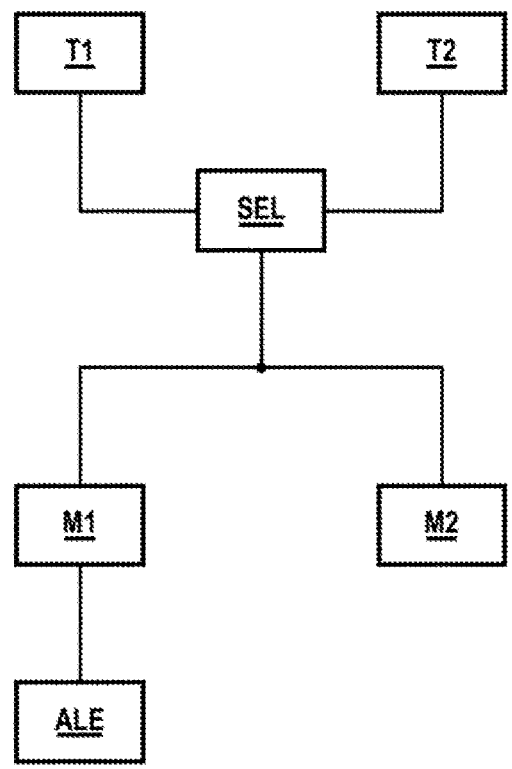
FIG. 2 is a flowchart of steps of a method according to one embodiment of the invention.

In order to verify correct operation of the actuating system, the position feedback measurements 12, 22 originating in the position feedback modules are communicated to a monitoring system 20 which allows in particular evaluating the position feedback measurement 12, 22 deviations of each cylinder 11, 21. For this reason, the monitoring system 20 comprises a processing unit such as a processor to implement a monitoring method described hereafter, in relation with FIG. 2.

The monitoring system 20 takes as input each position feedback measurement 12, 22 originating in the position feedback modules.

The detection of a transient phase (steps T1, T2 respectively) of the position feedback measurement 12, 22 of each cylinder 11, 21 is implemented on the basis of the position feedback measurements 12, 22.

A detection T1, T2 of this type allows evaluating whether the position feedback measurement 12, 22 relating to each cylinder 11, 21 is in a transient phase, i.e. not stabilized and therefore not reliable, or whether it is in a stabilized phase and considered to be reliable.

In fact, the Applicant has observed that the deviations of position feedback measurements between cylinders 11, 21 increased when these measurements were in a transient phase. The phase during which the kinematics is in movement is called the transient phase.

Figure 3:
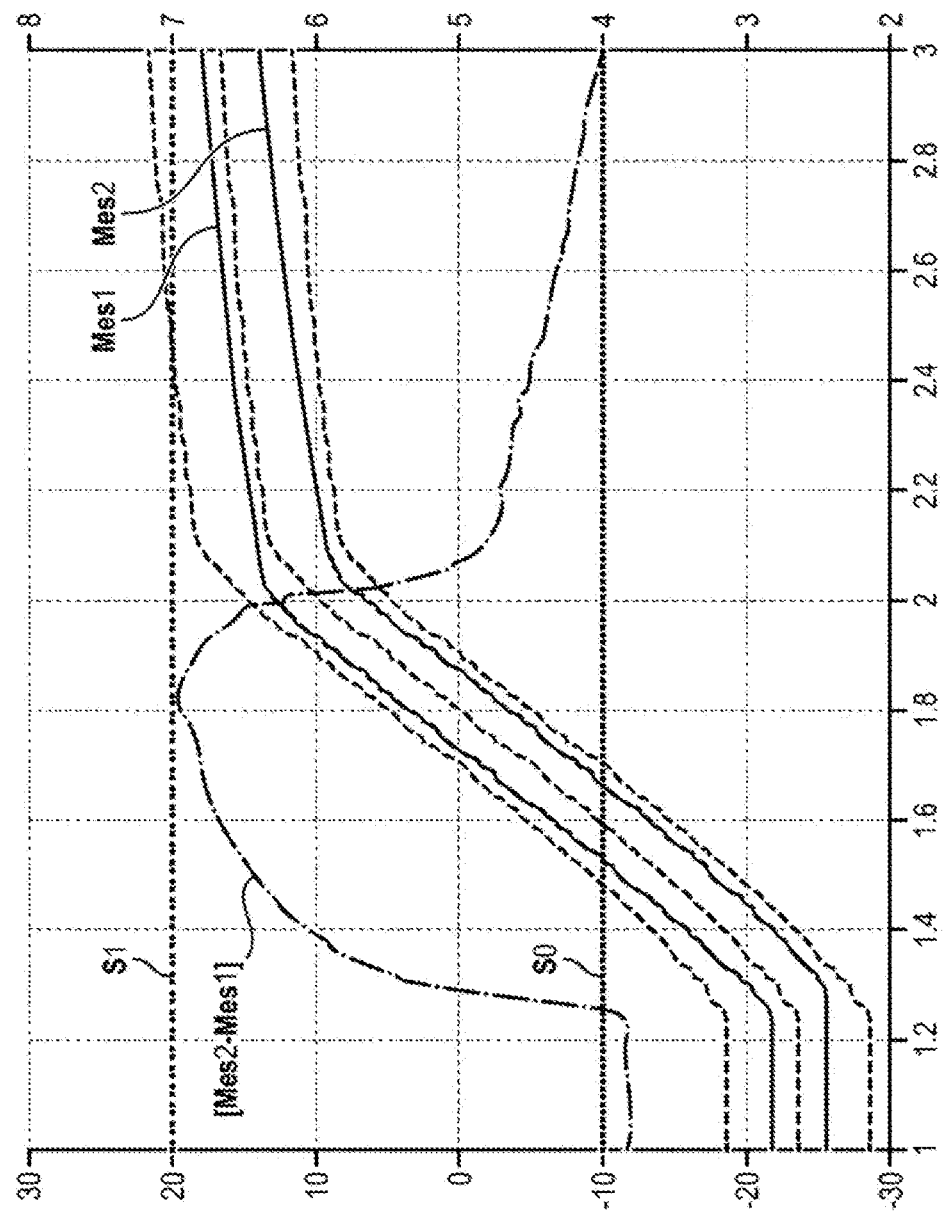
FIG. 3 illustrates problems solved by the invention.

FIG. 3 illustrates that the fact that the deviations between measurements between the cylinders 11, 21 were increasing during the transient phases. In these figures are shown:

the variation of the position feedback measurement of the first cylinder 11 (curve Mes1)

the variation of the position feedback measurement of the second cylinder 21 (curve Mes2)

the variation of the deviation between the two measurements (curve |Mes2−Mes1|)

a first detection threshold S0 and a second detection threshold S1.

Thus it has been noted that, even by increasing the detection threshold from S0 to S1, the deviation between the two measurements was always above the threshold S1 for a long period so that it was difficult to configure a threshold and a deviation observation period (in order to ensure that the deviation was actually above the threshold) with would allow both having reliable monitoring (impacted by the definition of a high detection threshold) and which would not detect false breakdowns.

Consequently, taking this observation into account, the Applicant proposes not monitoring the deviation of the position feedback measurement during these transient phases because monitoring in this case is not robust, i.e. it is not reliable.

Thus, depending on whether the position feedback measurements have a transient character or not, the monitoring method implemented by the monitoring system comprises two monitoring modes which can be consequently selected (step SEL). Thus are defined:

a first monitoring mode M1 during which deviations between the position feedback measurements of the two cylinders 11, 21 are detected;

a second monitoring mode M2 during which deviations between the position feedback measurements of the two cylinders 11, 21 are not detected.

The second monitoring mode M2 is selected (step SEL) provided that at least one of the two position feedback measurements 12, 22 is in a transient phase.

Thus, provided that one of the two position feedback measurements is in a transient phase of selecting the first or the second monitoring mode.

When the first mode M1 is selected, the deviation of position feedback measurements 12, 22 allows generating, if necessary, an alarm relating to an abnormal measurement deviation which will trigger maintenance (step ALE). For this reason, a triggering threshold is set and depends on the parameters of the actuated system and its actuating system.

Figure 4:
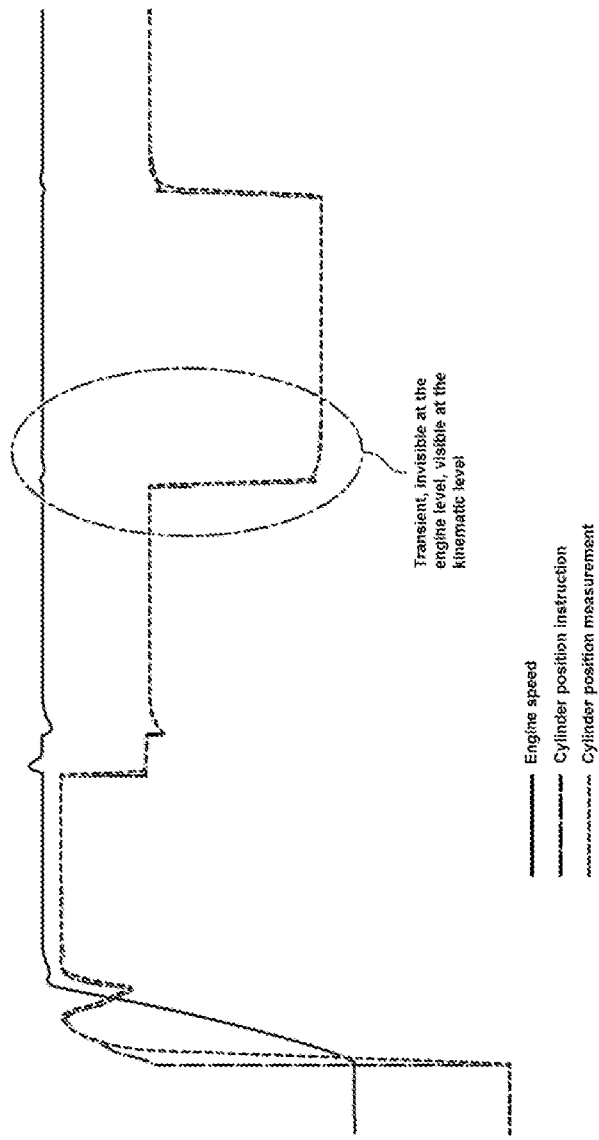
FIG. 4 illustrates visible and invisible transients discriminated by the invention.

To mitigate the variability of the transient phases due to the aging of the engine, and/or to the operating mode, and/or to the flight envelope, and/or to the type of maneuvers (accelerations/decelerations, slow or rapid), and to have accurate management of the detection of the transient phase at the cylinders 11, 21, the detection of the transient phase is accomplished by means of monitoring a gradient of each of the position measurements 12, 22 and not in a transient phase of the engine itself (change of speed/temperature/ overall pressure of the engine and not only of the module under consideration). In fact, there exist certain visible transient phases at the level of the cylinders 11, 21 and not at the level of the engine as shown by FIG. 4. Thus, advantageously, the transient character of each position feedback measurement 12, 22 is evaluated while considering the gradient of each measurement. Of course, other possibilities for obtaining the transient character of the measurements could be implemented.

The detection of the transient character (steps T1, T2) comprises the following steps described in relation with FIG. 5.

The gradient of the position feedback measurement, for a given cylinder 11, 21, is obtained as follows (step E1):

$$gradient_i = measurement_i - measurement_{i-1},$$

with i and i−1 the time that the measurement is taken. Thus, the gradient calculated at time i is the difference between two consecutive measurements.

The detection of the transient phase is therefore elaborated on the position feedback measurement 12, 22 (image of the true position of the cylinders 11, 21) rather than on the position instruction CONS of the cylinders 11, 21. In fact, the instruction CONS is not representative, at all times, of the real behavior of the cylinders 11, 21, particularly at the end of the transient phase where the instruction CONS is stabilized but where the cylinders 11, 21 are terminating their movement. This has the disadvantage of presenting an electrically noisy position feedback measurement 12, 22 and having variations due to the forces applied to the cylinders 11, 21. The gradient elaborated on a measurement of this type is therefore noisier still, imposing therefore the accomplishment of the detection of the transient phase on a filtered position feedback measurement 12, 22.

The gradient calculated at time I is then filtered as follows (step E2):

$$\text{Filtered gradient}_i = \text{filtered\_gradient}_{i-1} + CTE \cdot (\text{gradient}_i - \text{filtered\_gradient}_{i-1}).$$

The filtering takes into account two values of the gradient calculated consecutively.

The constant CTE of the filter is set by taking into account the following elements:
- a large time constant allows filtering the majority of the electrical and mechanical perturbations but greatly delays the detection of the gradient and strongly attenuates the levels of variations of the transient phase(s);
- a small time constant allows rapid detection of a transient phase, but favors false transient phase detection provided that they read levels near the threshold (which can be fairly low depending on the dynamics of the kinematics at the points where the hydro-mechanical power is low).

The value of the filtered gradient at time I is then compared to a threshold (step E3). In particular, to indicate a transient character of the position feedback measurement 12, 22 of the cylinder 11, 21 under consideration, this value of the filtered gradient at time i must be greater than a predetermined threshold.

In order not to deactivate the monitoring to early, this transient character must be confirmed, during a confirmation step (step E4).

To this end, the filtered gradient must be greater than a certain threshold for a period fixed in advance, called the confirmation period. A period of this type is typically comprised between 60 and 100 ms, preferably 80 ms. The confirmation period must be fairly large to contribute robustness without being too high so as not to cause too much delay in the deactivation of the monitoring of the deviations. For this reason, the confirmation period will be a function of the shortest existing transient phase in the kinematics. The confirmation period is therefore fixed empirically.

If the transient character of the position feedback measurement of the cylinder 11, 21 under consideration is confirmed, the monitoring of the measurement deviation between the cylinders 11, 21 is deactivated.

A selection of the monitoring mode is implemented, the second monitoring mode M2 is selected. If this is not the case, the first monitoring mode M1 is selected.

The confirmation period is advantageous for two reasons:
- the filtering of the gradient introduces a delay into the detection of a transient character and an attenuation of the amplitude [of] the value, which leads to providing a reduction of the detection threshold compared to a detection on non-filtered values.
- the reduction of the detection threshold can lead to unintentional detections of transient phases, and thus deactivate monitoring when that is not justified.

The invention described above advantageously has a self-supporting transient phase detection with respect to the cylinders 11, 21 of the module under consideration: it depends only on parameters intrinsic to the cylinders 11, 21, without basing itself either on the engine condition (stationary speed, transient speed, etc. . . . ) or on the instruction CONS applied to the cylinders 11, 21. As a result, the monitoring system 20 is made independent of any failure mode (start of an electrical drift measurement) and of any variability from engine to engine. Moreover, the present invention proposes means for mitigating the faults linked to the use of raw measurements by introducing filtering of the position feedback measurements 12, 22 and confirmation of the start and end of the transient phase. Finally, the present invention allows making the detection of the position measurement deviations 12, 22 of the cylinders 11, 21 robust by mitigating the limitations linked to an enlargement of the threshold and/or of timeout and therefore improving the troubleshooting (monitoring) associated with the detection of deviation breakdowns.

The invention claimed is:

1. A method for monitoring an actuating system (10) of a movable component, particularly a movable component of a turbomachine such as a nozzle or a blade, said actuating system (10) comprising a control device (1) configured to deliver a position instruction (CONS) to a first cylinder (11) and a second cylinder (21), each cylinder (11, 21) being configured to deliver a position feedback measurement (12, 22) in response to said position instruction (CONS), the method being implemented in a monitoring system (20), the monitoring system comprising:
   a first monitoring mode (M1) in which deviations between the position feedback measurements (12, 22) of the two cylinders (11, 21) are detected;
   a second monitoring mode (M2) in which deviations between the position feedback measurements (12, 22) of the two cylinders (11, 21) are not detected, the method comprising:
   monitoring, by said monitoring system, and
   selecting the second mode when it's detected that one of the two position feedback measurements is in said transient phase.

2. The method according to claim 1, comprising a detection (T1, T2) of the transient phase of a position feedback measurement (12, 22) consisting of comparing (E3) a gradient of a measurement voltage to a threshold.

3. The method according claim 2, wherein the measurement voltage is in a transient phase if the gradient of the measurement voltage is greater than said threshold.

4. The method according to claim 2, wherein the detection of the transient phase comprises a step of confirming the transient phase consisting of detecting a transient phase of said measurement voltage for a predetermined period, called the confirmation period.

5. The method according to claim 4, wherein the predetermined period is comprised between 60 and 100 ms.

6. A monitoring system (20) of an actuating system (10) of a movable component, particularly a movable component of a turbomachine such as a nozzle or a. blade, said actuating system (10) comprising a control device (1) configured to deliver a position instruction (CONS) to a first cylinder (11) and a second cylinder (12), each cylinder (11, 12) being configured (12, 22) to deliver a position feedback measurement in response to said position instruction, said monitoring system being configured to implement a method according to claim 1.

7. A turbomachine comprising: an actuating system; a component of the turbomachine configured to be actuated by the actuating systems; a monitoring system (20) for monitoring the actuating system according to claim 1.

\* \* \* \* \*